United States Patent
Farooq et al.

(10) Patent No.: US 10,953,844 B2
(45) Date of Patent: Mar. 23, 2021

(54) EXTERNAL AIRBAG SYSTEM FOR PEDESTRIAN PROTECTION

(71) Applicant: Ford Global Technologies, LLC, Dearborn, MI (US)

(72) Inventors: S. M. Iskander Farooq, Novi, MI (US); Saeed David Barbat, Novi, MI (US); Srinivasan Sundararajan, Ann Arbor, MI (US); Mohammad Omar Faruque, Ann Arbor, MI (US); Dean M. Jaradi, Macomb, MI (US); Nirmal Muralidharan, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 15/890,684

(22) Filed: Feb. 7, 2018

(65) Prior Publication Data
US 2019/0001919 A1    Jan. 3, 2019

Related U.S. Application Data

(60) Provisional application No. 62/526,447, filed on Jun. 29, 2017.

(51) Int. Cl.
| | | |
|---|---|---|
| *B60R 21/36* | (2011.01) | |
| *B60R 21/34* | (2011.01) | |
| *B60R 19/18* | (2006.01) | |

(52) U.S. Cl.
CPC ...... *B60R 21/36* (2013.01); *B60R 2019/1886* (2013.01); *B60R 2021/346* (2013.01)

(58) Field of Classification Search
CPC .............. B60R 21/36; B60R 2021/346; B60R 2019/1886; B60R 21/34; B60R 19/205
See application file for complete search history.

(56) References Cited

U.S. PATENT DOCUMENTS 1,704,768 A * 3/1929 Myer ..................... B60R 21/34
                                                              293/120
3,618,998 A * 11/1971 Swauger .............. B62D 35/005
                                                             296/180.5
(Continued)

FOREIGN PATENT DOCUMENTS

| EP | 1319560 B1 | 3/2006 |
| JP | 2001322518 A | 11/2001 |
| JP | 5186942 B2 | 4/2013 |

OTHER PUBLICATIONS

"Toyota Gosei Exhibits Airbags for Pedestrian Protection", Nikkei Technology, Tech & Industry Analysis from Japan/Asia Online, Nikkei Business Publications, Inc. (3 pages).

(Continued)

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

An external airbag system includes an airbag, a carrier, an inflator and a trim panel. The airbag has an upper chamber and a parallel lower chamber sealingly separated by a laterally extending first seam. The carrier is connected to the airbag at the first seam. The inflator is fixed relative to the carrier and is in fluid communication with the airbag. The trim panel is fixed to the carrier, enclosing the airbag therebetween. The trim panel has a tear seam substantially aligned with the airbag.

12 Claims, 9 Drawing Sheets

(56) References Cited

U.S. PATENT DOCUMENTS

| | | | | |
|---|---|---|---|---|
| 3,822,076 | A * | 7/1974 | Mercier | B60R 19/205 293/107 |
| 3,992,047 | A * | 11/1976 | Barenyi | B60R 19/14 293/9 |
| 4,015,870 | A * | 4/1977 | Stcherbatcheff | B60R 21/34 293/32 |
| 4,119,339 | A * | 10/1978 | Heimburger | B62D 35/005 296/180.5 |
| 4,159,140 | A * | 6/1979 | Chabot | B62D 35/005 296/180.5 |
| 4,489,806 | A * | 12/1984 | Shimomura | B62D 35/005 180/313 |
| 4,659,130 | A * | 4/1987 | Dimora | B62D 35/005 296/180.1 |
| 4,758,037 | A * | 7/1988 | Suzuki | B62D 35/005 296/180.1 |
| 4,904,016 | A * | 2/1990 | Tatsumi | B62D 35/005 296/180.5 |
| 5,460,420 | A * | 10/1995 | Perkins | B60K 11/02 293/106 |
| 5,810,427 | A * | 9/1998 | Hartmann | B60R 19/40 280/742 |
| 6,106,038 | A * | 8/2000 | Dreher | B60R 19/205 293/107 |
| 6,227,325 | B1 * | 5/2001 | Shah | B60R 19/205 180/274 |
| 6,428,065 | B2 * | 8/2002 | Sato | B60R 19/12 293/102 |
| 6,510,914 | B2 * | 1/2003 | Ishizaki | B60R 21/0136 180/274 |
| 6,513,843 | B1 * | 2/2003 | Frederick | B60R 19/18 293/36 |
| 6,572,086 | B2 * | 6/2003 | Kelly | B60R 19/44 267/136 |
| 6,637,788 | B1 * | 10/2003 | Zollner | B60R 19/14 293/107 |
| 6,663,151 | B2 * | 12/2003 | Mansoor | B60R 19/12 293/102 |
| 6,739,634 | B1 * | 5/2004 | Pagan | B60R 19/44 293/117 |
| 6,886,883 | B2 * | 5/2005 | Jacquemard | B62D 35/005 296/180.5 |
| 6,920,954 | B2 * | 7/2005 | Hashimoto | B60R 21/2155 180/274 |
| 6,923,483 | B2 * | 8/2005 | Curry | B60R 19/205 180/274 |
| 6,945,348 | B2 * | 9/2005 | Henderson | B60R 19/12 180/271 |
| 7,036,844 | B2 * | 5/2006 | Hammer | B60R 19/205 280/729 |
| 7,040,690 | B2 * | 5/2006 | Soja | B62D 35/005 296/180.5 |
| 7,073,619 | B2 * | 7/2006 | Alexander | B60R 21/2338 180/274 |
| 7,185,728 | B2 * | 3/2007 | Makita | B60R 19/205 180/274 |
| 7,516,994 | B2 * | 4/2009 | Ito | B60R 19/18 293/102 |
| 7,607,717 | B2 * | 10/2009 | Browne | B62D 35/00 296/180.1 |
| 7,686,382 | B2 * | 3/2010 | Rober | B62D 35/007 296/180.1 |
| 7,699,383 | B2 * | 4/2010 | Fukukawa | B60R 19/12 293/132 |
| 7,753,159 | B2 * | 7/2010 | Kim | B60R 21/0136 180/274 |
| 7,757,804 | B1 * | 7/2010 | Li | B60R 21/34 180/274 |
| 8,033,356 | B2 * | 10/2011 | Kim | B60R 21/36 180/271 |
| 8,141,918 | B2 * | 3/2012 | Miller | B60R 19/18 293/143 |
| 8,408,350 | B2 * | 4/2013 | Wilmot | B60R 21/36 180/274 |
| 8,562,067 | B2 * | 10/2013 | Hoelzel | B62D 35/005 296/180.5 |
| 8,662,237 | B2 * | 3/2014 | Chung | B60R 19/205 180/274 |
| 8,672,078 | B2 * | 3/2014 | Lee | B60R 19/205 180/271 |
| 8,702,152 | B1 * | 4/2014 | Platto | B62D 35/005 296/180.1 |
| 8,752,860 | B2 * | 6/2014 | Kim | B60R 19/205 280/728.2 |
| 8,764,078 | B1 * | 7/2014 | Lemonides | B60R 13/105 293/107 |
| 9,016,717 | B1 * | 4/2015 | Clauser | B60R 21/233 280/729 |
| 9,233,662 | B2 * | 1/2016 | Kito | B60R 21/34 |
| 9,511,739 | B2 | 12/2016 | Thomas | |
| 9,714,058 | B2 * | 7/2017 | Fahland | B62D 35/005 |
| 9,764,706 | B2 * | 9/2017 | Benvenuto | B60R 19/48 |
| 9,937,966 | B1 * | 4/2018 | Yoon | B62D 25/182 |
| 9,950,754 | B2 * | 4/2018 | Povinelli | B62D 35/02 |
| 9,956,998 | B2 * | 5/2018 | Zielinski | B62D 35/005 |
| 10,046,729 | B2 * | 8/2018 | Perez Garcia | B60R 21/36 |
| 10,099,649 | B2 * | 10/2018 | Osanai | B60R 21/36 |
| 2004/0074688 | A1 * | 4/2004 | Hashimoto | B60R 21/2155 180/271 |
| 2004/0217605 | A1 * | 11/2004 | Banry | B60R 19/18 293/120 |
| 2005/0269805 | A1 * | 12/2005 | Kalliske | B60R 21/36 280/730.1 |
| 2009/0102167 | A1 * | 4/2009 | Kitte | B60R 21/233 280/728.2 |
| 2009/0152041 | A1 * | 6/2009 | Kim | B60R 21/36 180/274 |
| 2009/0289471 | A1 * | 11/2009 | Finney | B60R 19/40 296/187.04 |
| 2010/0059972 | A1 * | 3/2010 | Kim | B60R 21/0136 280/728.2 |
| 2012/0132475 | A1 | 5/2012 | Kim et al. | |
| 2012/0267183 | A1 | 10/2012 | Wilmont et al. | |
| 2012/0330513 | A1 * | 12/2012 | Charnesky | G01S 13/931 701/48 |
| 2015/0183395 | A1 * | 7/2015 | Revankar | B60R 19/40 180/274 |
| 2017/0247014 | A1 * | 8/2017 | Farooq | B60R 19/12 |

OTHER PUBLICATIONS

Search Report for United Kingdom Intellectual Property Office dated Nov. 23, 2018 regarding Application No. GB1810673.2 (7 pages).

* cited by examiner

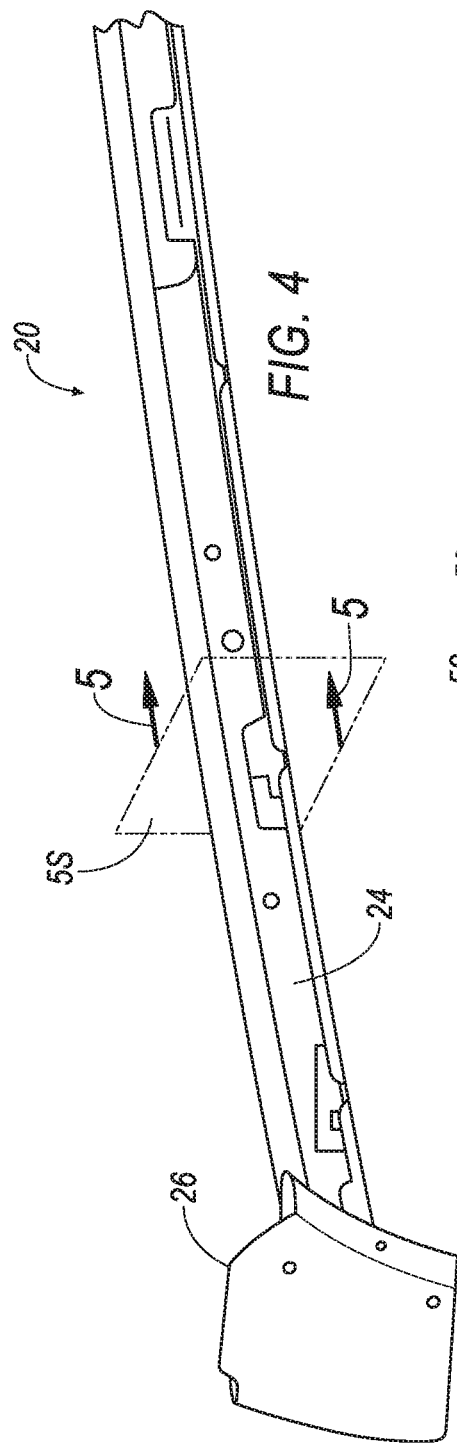
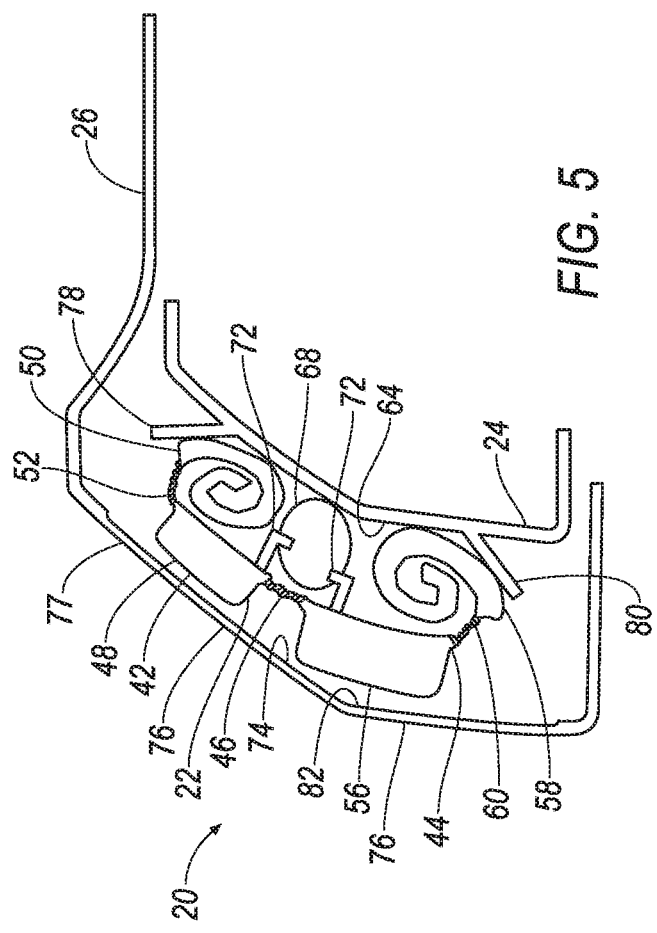

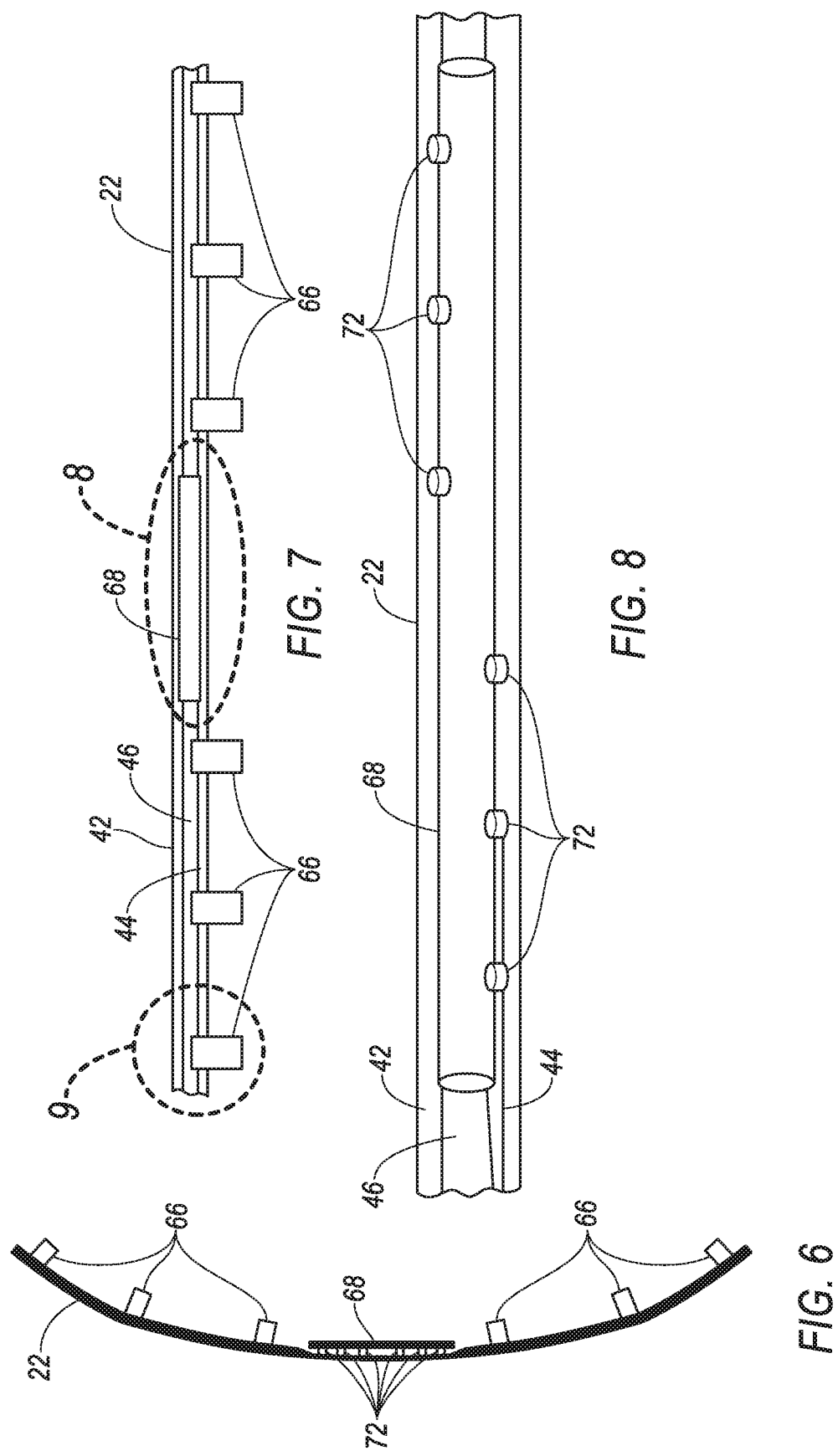

# EXTERNAL AIRBAG SYSTEM FOR PEDESTRIAN PROTECTION

CROSS-REFERENCE TO RELATED APPLICATIONS

The subject patent application claims priority to and all the benefits of U.S. Provisional Patent Application No. 62/526,447 filed on Jun. 29, 2017, which is herein incorporated by reference in its entirety.

BACKGROUND

Anticipated regulations and rating systems, e.g., Global Technical Regulation No. 9, Pedestrian Safety ("GTR9"), and United States New Car Assessment Program for the year 2020 ("USNCAP 2020"), include pedestrian protection performance targets. Pedestrian protection targets include equipping a vehicle with a Pedestrian Autonomous Emergency Braking ("PAEB") system which includes a pedestrian detection system and automatic braking in response to sensing a pedestrian in a forward path. The regulations and ratings also evaluate the effectiveness of protection provided to pedestrians when vehicle-to-pedestrian contact occurs. The front-end of trucks, such as a pick-up truck, presents many design challenges to improving pedestrian protection. There remains an opportunity to provide improved pedestrian protection.

BRIEF DESCRIPTION OF THE DRAWINGS

FIG. 4 is a perspective view of the airbag system of FIG. 3 from a left-rear position looking in a right-front direction.

FIG. 5 is a section view of the airbag system of FIG. 4 through the plane 5S in the direction of arrows 5.

FIG. 6 is a top view of the airbag of FIG. 4.

FIG. 7 is a rear view of the airbag of FIG. 4.

FIG. 8 is an enlarged broken-out view of the portion of the airbag of FIG. 7 in the ellipse 8.

DETAILED DESCRIPTION

Figure 1:
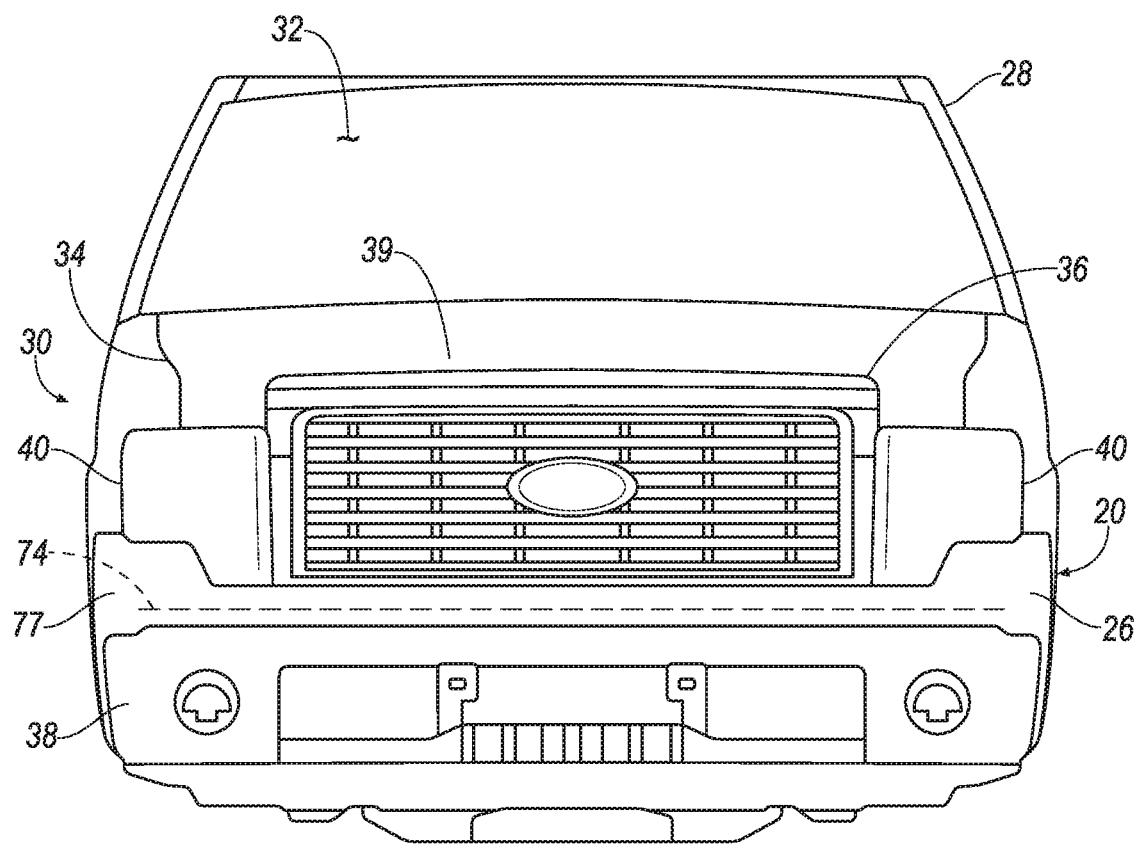
FIG. 1 is a front view of a vehicle incorporating an external airbag system for pedestrian protection with the airbag in an uninflated position.
Figure 2:
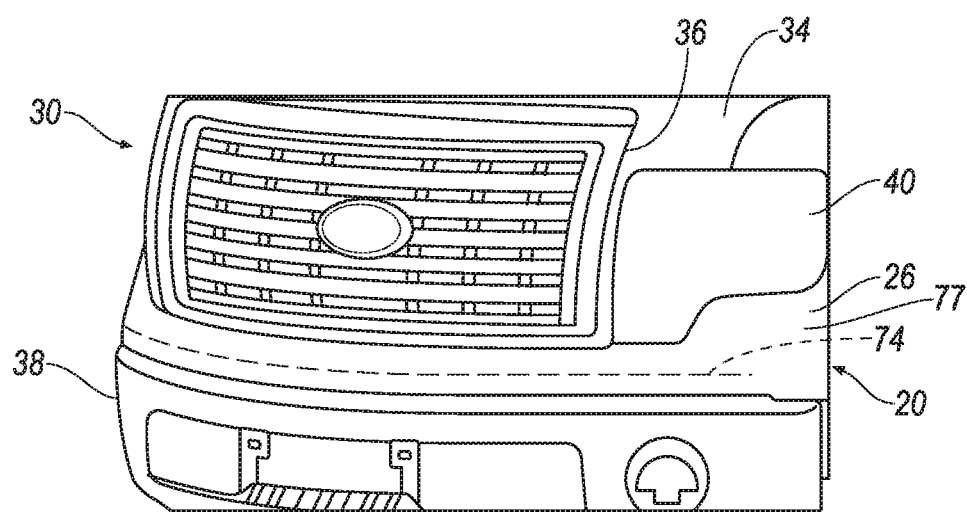
FIG. 2 is a broken-out perspective view of a front left corner of the vehicle of FIG. 1.
Figure 3:
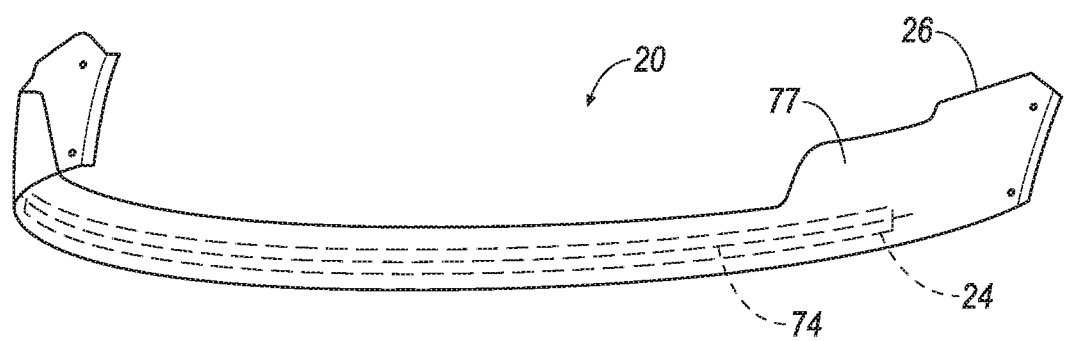
FIG. 3 is a perspective view of the external airbag system of FIGS. 1 and 2.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

An external airbag system includes an airbag, a carrier, an inflator and a trim panel. The airbag has an upper chamber and a parallel lower chamber sealingly separated by a laterally extending first seam. The carrier is connected to the airbag at the first seam. The inflator is fixed relative to the carrier and is in fluid communication with the airbag. The trim panel is fixed to the carrier, enclosing the airbag therebetween. The trim panel has a tear seam substantially aligned with the airbag.

The carrier may include an upper chute engaging the upper chamber of the airbag and a lower chute engaging the lower chamber of the airbag.

The external airbag system may include a plurality of tethers intermediate between and connecting the carrier and the airbag.

The upper chamber may include parallel laterally extending upper first and second subchambers with the upper first and second subchambers being separated from each other by an upper secondary seam. The lower chamber may include parallel laterally extending lower first and second subchambers with the lower first and second subchambers being separated from each other by a lower secondary seam.

The subchambers of the upper chamber may include upper fluid communication channels disposed in the upper secondary seam between and fluidly connecting the upper first and second subchambers. The subchambers of the lower chamber may include lower fluid communication channels disposed in the lower secondary seam between and fluidly connecting the lower first and second subchambers The chambers may be rolled toward the first seam in an uninflated position.

The subchambers of the external airbag system may be vertically stacked in an inflated position.

The trim panel of the external airbag system may be sized to fit between a vehicle grille and a vehicle bumper.

The upper chamber of the external airbag system may extend beyond a leading edge of a vehicle hood in the inflated position, and the lower chamber of the external airbag system may extend below the vehicle bumper in the inflated position.

The external airbag system may include a plurality of stabilizing tethers disposed between the carrier and the subchambers.

With reference to FIGS. 1-14, an example external airbag system 20 includes an airbag 22, a carrier 24 and a trim panel 26. The airbag 22 is deployable from an uninflated position, i.e., undeployed position, shown in FIGS. 1, 2, 3, 4, 5, 6, 7, 8, 9, and 10 to an inflated position, i.e., deployed position, shown in FIGS. 11, 12A, 12B, 12C and 13.

The airbag system 20 is illustrated as mounted in an example vehicle 28, the illustrated example vehicle 28 being representative of a light duty and a medium duty truck cab. The airbag system 20 defines part of a front fascia 30 of the vehicle 28. The front fascia 30 is disposed below and forward of a windshield 32 of the vehicle 28. A vehicle hood 34, i.e., an engine bonnet, is forward of the windshield 32 and may form part of the fascia 30. A vehicle grille 36 may be incorporated into the fascia 30 and may be disposed between the hood 34 and a vehicle bumper 38. A leading edge 39 of the hood 34 is the forward-most edge of the hood 34. Headlights 40, also forming part of the fascia 30, may be adjacent to the grille 36. The airbag system 20 is illustrated in an example location between the grille 36 and the bumper 38.

The airbag 22 has an upper chamber 42 deployable in a first direction D1 and a lower chamber 44, parallel to the upper chamber 42, and deployable in a second direction D2 opposite the first direction D 1. The first direction D1 may be a generally upward direction following the grille 36, and the second direction D2 may be a generally downward direction normal to the ground and overlapping the bumper 38. In the inflated position, the airbag 22 extends laterally across a front end of the vehicle 28, and extends vertically below the bumper and upward beyond the leading edge 39, i.e., the forward upper edge, of the hood 34. The airbag 22 at least substantially covers the fascia 30 of the vehicle 28.

The airbag 22 includes a first or middle seam 46 extending laterally across an entire width of the uninflated airbag 22, both connecting the chambers 42, 44 and sealingly separating the upper chamber 42 from the lower chamber 44. With the middle seam 46 providing a sealed border between the upper chamber 42 and the lower chamber 44, pressure in one chamber will remain substantially unaffected if a leak should occur in the other chamber. Providing fluid communication between the chambers 42 and 44 would diminish the pressure independence of the chambers, but would still allow the system 20 to function sufficiently. The middle seam 46 divides the upper chamber 42 from the lower chamber 44. The middle seam 46 may or may not coincide with a center of the airbag 22. When the airbag 22 deploys, the upper chamber 42 and the lower chamber 44 move from the uninflated position to the inflated position, and the middle seam 46 may remain in the same position. The airbag system 20 may include any one, or combinations, of the additional components described in particular embodiments below.

Figure 12C:
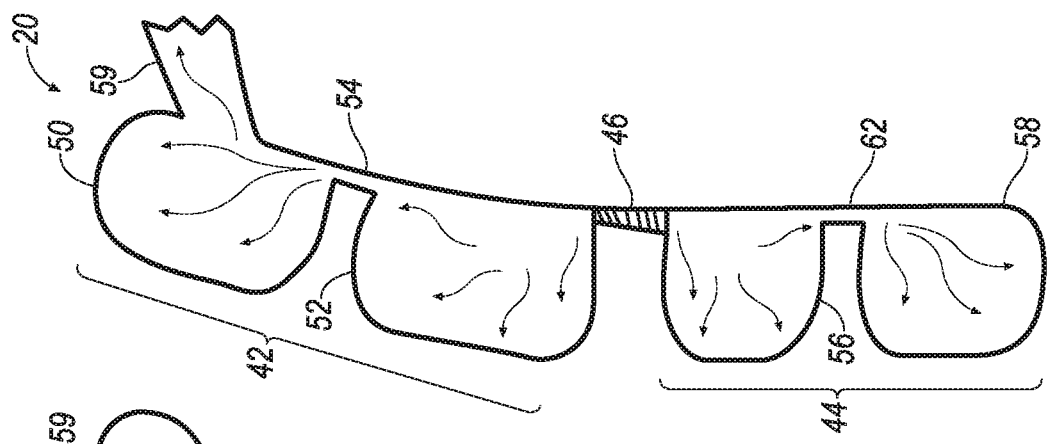
FIGS. 12A, 12B and 12C are section views of the airbag of FIG. 11 in the direction of arrows 12A, 12B and 12C respectively.
Figure 12B:
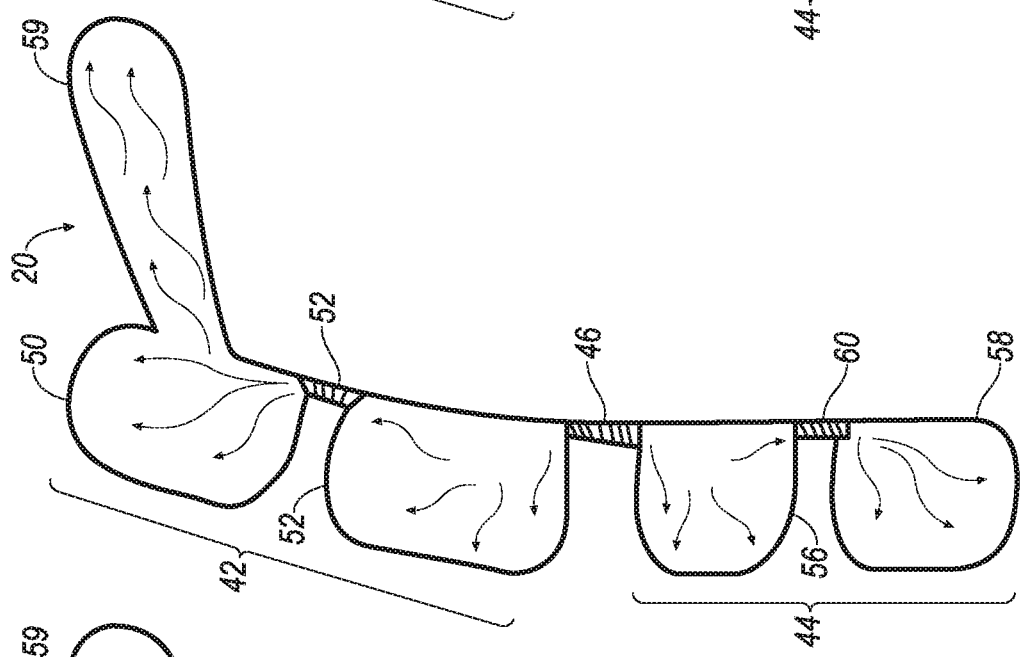
Figure 12A:
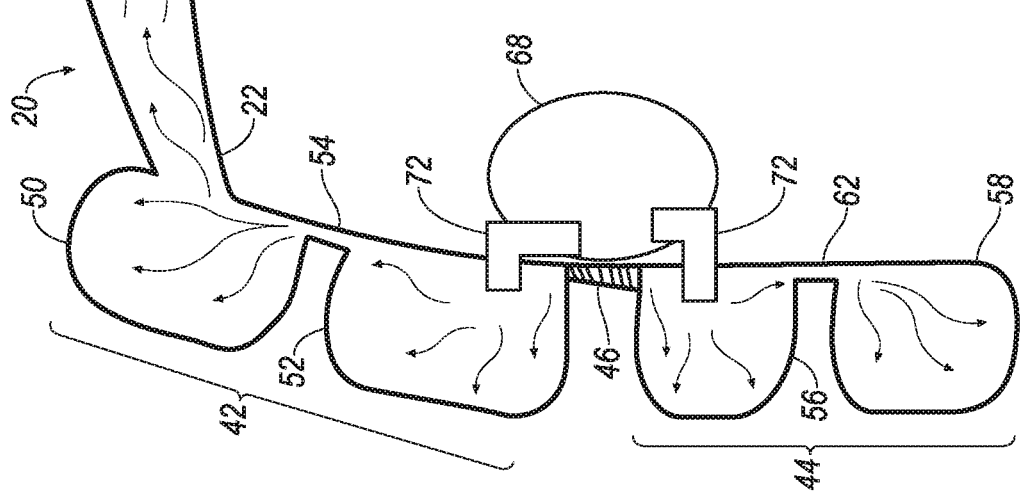

Each of the upper chamber 42 and the lower chamber 44, as best shown in FIGS. 12A, 12B and 12C, are divided into laterally extending parallel first and second subchambers. Each of the chambers 42, 44 includes its respective subchambers. More subchambers could be employed if desired.

A first subchamber 48 of the upper chamber 42 is adjacent to the middle seam 46. A second subchamber 50 of the upper chamber is adjacent to the first subchamber 48, with the first subchamber 48 being between the middle seam 46 and the second subchamber 50. The subchambers 48 and 50 are in fluid communication with each other. The subchambers 48 and 50 may be divided from each other by an upper secondary seam 52. The secondary seam allows fluid communication between the subchambers 48 and 50. The secondary seam incorporates upper fluid communication channels 54 between the subchambers 48 and 50, example fluid communication channels 54 as may be provided by tubes (not shown) or gaps in the seam 52. Subchamber 50 may include an appendage chamber 59. Appendage chamber 59 may be positioned to overlie a forward portion of the hood 34 in the inflated position.

Likewise, a first subchamber 56 of the lower chamber 44 is adjacent to the middle seam 46. A second subchamber 58 of the lower chamber 44 is adjacent to the first subchamber 56, with the first subchamber 56 being between the middle seam 46 and the second subchamber 58. The subchambers 56 and 58 are in fluid communication with each other. The subchambers 56 and 58 may be divided from each other by a lower secondary seam 60. The lower secondary seam 60 allows fluid communication between the subchambers 56 and 58. The secondary seam incorporates lower fluid communication channels 62 between the subchambers 56 and 58, example fluid communication channels 62 including tubes (not shown) or gaps in the seam 60.

The airbag 22 may be formed of any suitable airbag material, for example, a woven polymer. For example, the airbag 22 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 22 is fixed to a forward side 64 of the carrier 24. The airbag 22 may be directly attached to the forward side 64, that is, attached to with no intermediate components, or alternatively may be attached with retention tethers 66 connecting the airbag 22 with the forward side 64. The tethers 66 may be formed as part of the airbag 22. When the airbag 22 is connected directly to the forward side 64, such connection may be provided between the seam 46 and the forward side 64 via stitching, adhesives, etc., as described in more detail below with respect to particular embodiments.

Figure 10:
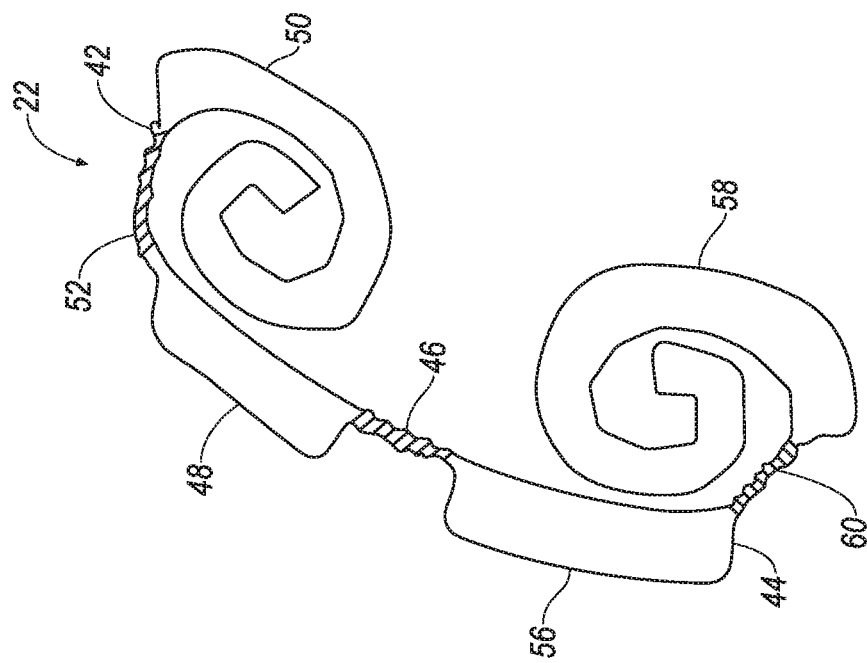
FIG. 10 is a section view of the airbag of FIG. 9 through the plane 10S in the direction of arrows 10.
Figure 9:
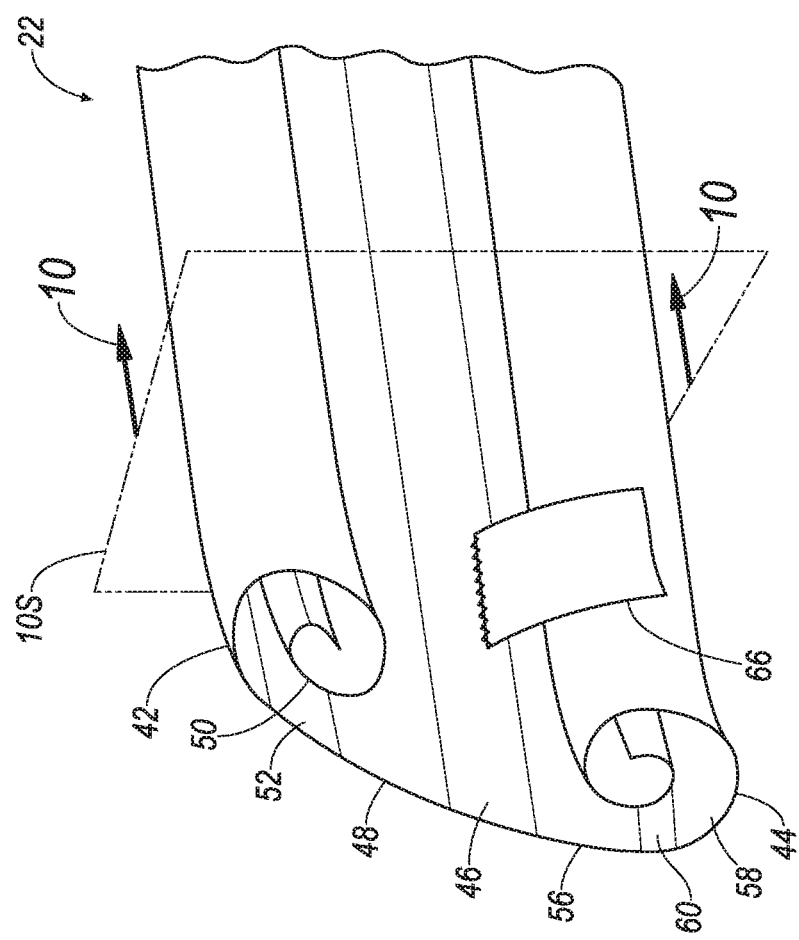
FIG. 9 is an enlarged broken-out view of the portion of the airbag of FIG. 8 in the ellipse 9.
Figure 11:
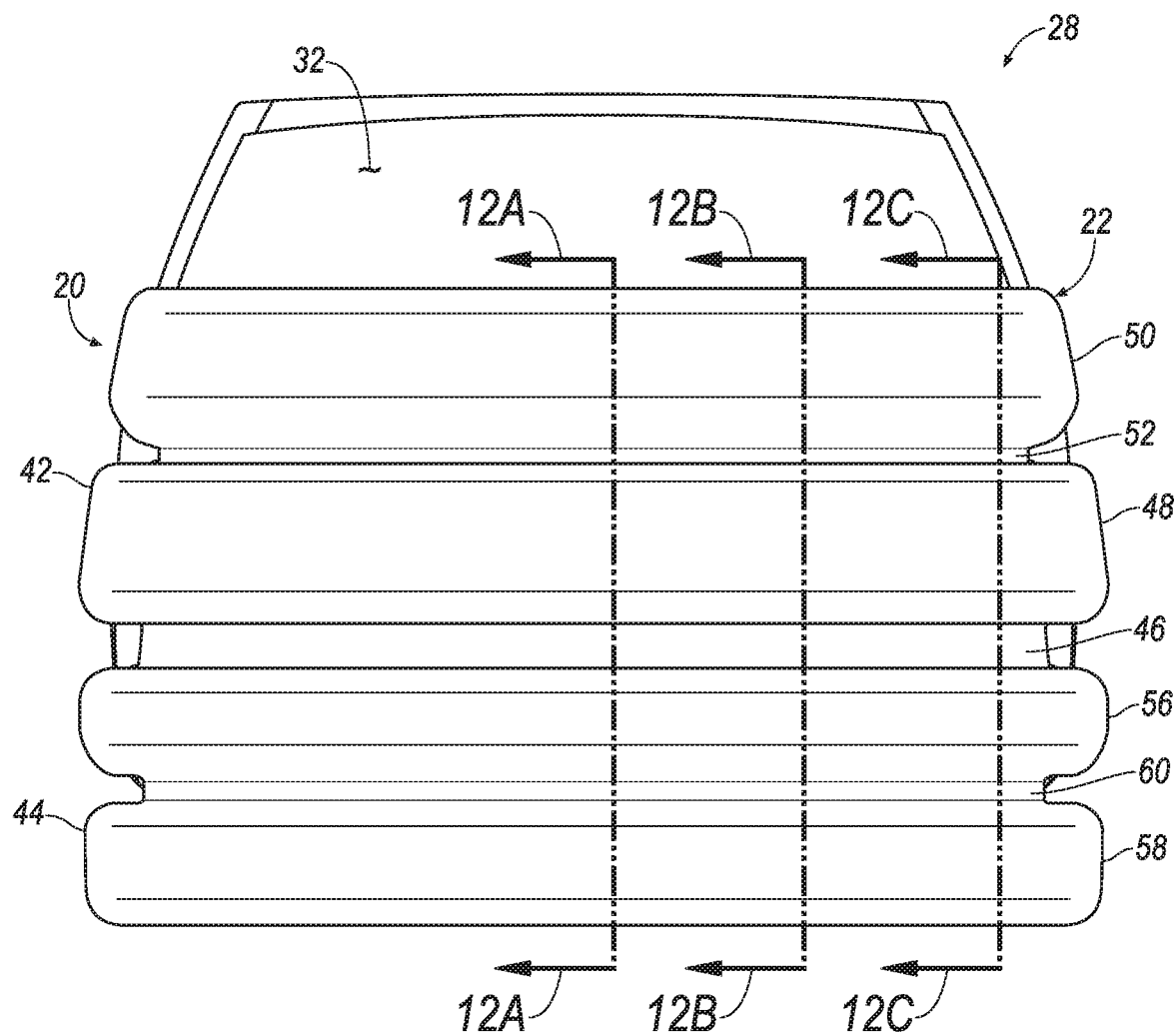
FIG. 11 is a front view of the vehicle of FIG. 1 with the airbag in an inflated position.

As best illustrated in FIGS. 9 and 10, the airbag 22 in an uninflated condition is stored in a double-rolled orientation, with each of the upper chamber 42 and the lower chamber 44 rolled in on themselves. The chambers 42, 44 are each rolled toward the seam 46 in an uninflated position.

The airbag system 20 includes an inflator 68 fixed to or fixed relative to the carrier 24. The inflator 68 is in fluid communication with the airbag 22. Upon receiving a signal from, e.g., a system processor 70 as described in more detail below, the inflator 68 may inflate the airbag 22 with an inflation medium, such as a gas. The inflator 68 may be, for example, a pyrotechnic inflator that uses a chemical reaction to drive inflation medium to the airbag 22. The inflator 68 may be of any suitable type, for example, a cold-gas inflator. Connecting tubes 72 may be provided between the inflator 68 and the airbag 22. A single inflator with multiple outlets to ensure proper gas flow pressure, rate of inflation, etc. is designed, however, multiple inflators can also be used, if needed.

The carrier 24 is connected to the trim panel 26, capturing the uninflated airbag 22 therebetween. The carrier 24 is fixed to the trim panel 26. The carrier 24 may be fixed to the trim panel by any conventional attachment means, including heat staking, rivets, threaded fasteners, adhesives, combinations of the preceding, etc.

The carrier 24 may be formed of a relatively rigid material or materials suited to provided structural support, e.g., composite reinforced thermoplastic, sheet steel, cast aluminum, etc.

The trim panel 26 is molded of plastic and includes a tear-seam 74 and a reduced-thickness flex panel 76 on at least one side of the tear-seam 74. The tear-seam 74 may extend laterally a full width of the uninflated airbag 22.

With reference to FIGS. 1, 2, 3, and 5, the trim panel 26 includes a tear-seam 74. The tear-seam 74 may be designed to tear apart when subjected to a tensile force above a threshold magnitude. In other words, the flex panel 76 on one side of the tear-seam 74 separates from the flex panel 76 on the other side of the tear-seam 74 when the force is above the threshold magnitude. The threshold magnitude may be chosen to be greater than forces from, e.g., inadvertent pushing against the trim panel 26 but be less than forces from the deployment of the airbag 22. The tear-seam 74 may be, for example, a line of perforations through or nearly through the trim panel 26, a line of thinner plastic than the rest of the trim panel 26, etc. Forming the tear-seam 74 on an inner surface 82 of the trim panel 26 allows an outer surface 77 of the trim panel 26 to be presented as a smooth surface.

The tear-seam 74 may be adjacent the airbag 22; that is, nothing is between the tear-seam 74 and the airbag 22. The tear-seam 74 may be adjacent the airbag 22 in the uninflated position. During deployment, the upper chamber 42 and the lower chamber 44 may each deploy toward and through the tear-seam 74.

With reference to FIG. 5, the carrier 24 may include chutes 78, 80. The carrier 24 includes an upper chute 78 adjacent the upper chamber 42 of the airbag 22 and a lower chute 80 adjacent the lower chamber 44 of the airbag 22. In other words, nothing is between the upper chute 78 and the upper chamber 42, and nothing is between the lower chute 80 and the lower chamber 44. The upper chute 78 may be in engagement with the upper chamber 42, and the lower chute 80 may be in engagement with the lower chamber 44.

The middle seam 46 may be fixed to the carrier 24 between the upper chute 78 and the lower chute 80. The upper chute 78 and the lower chute 80 may abut the airbag 22, i.e., be disconnected from and touching the airbag 22. The upper chute 78 and the lower chute 80 may be fixed to, i.e., attached directly to the inner surface 82 of the trim panel 26.

The upper chute 78 and the lower chute 80 may be formed integrally with the carrier 24. The upper chute 78 may curve upwardly toward the first direction D1, and the lower chute 80 may curve downwardly toward the second direction D2. The upper chute 78 and the lower chute 80 are designed to, i.e., sized, shaped, formed of selected material, etc., to direct the upper chamber 42 in the first direction D1 and to direct the lower chamber 44 in the second direction D2.

Figure 13:
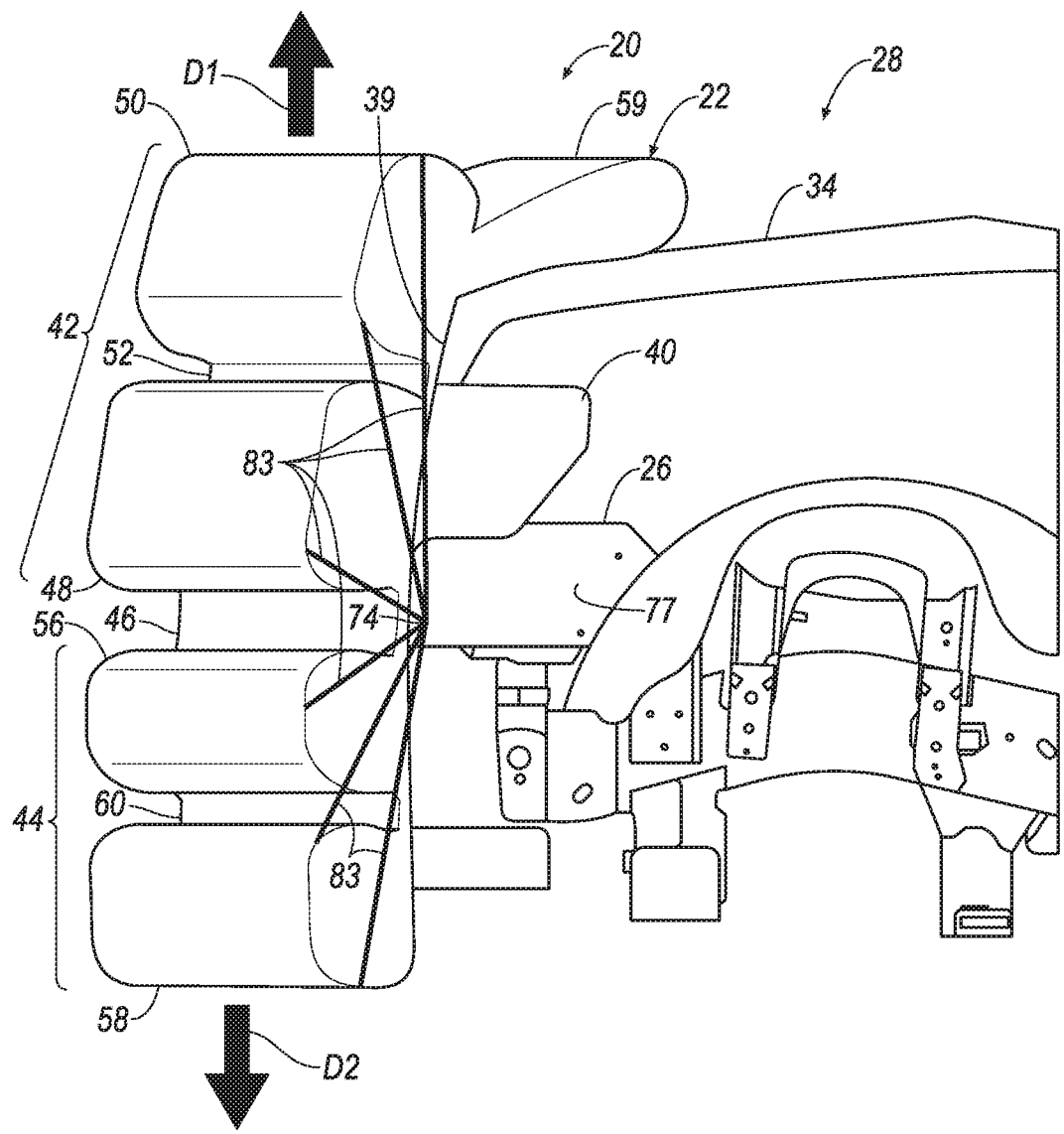
FIG. 13 is a side view of the vehicle of FIG. 1 and FIG. 11 with the airbag in an inflated position.

With reference to FIG. 13, the airbag system 20 may be equipped with a plurality of stabilizing tethers 83 restricting a displacement of the inflated subchambers 48, 50, 56, 58 relative to the carrier 24. The example tethers 83 as illustrated in FIG. 13 show the design of the tethers employed to maintain the shape, size and integrity of the airbag 22 when deployed. The tethers 83 extend from the carrier 24 to selected locations on the airbag 22. Although the illustrated stabilizing tethers 83 are shown on an outside of the airbag 22, i.e., external tethers, the stabilizing tethers may be disposed inside the airbag. Such inside tethers (not shown) may be disposed between the carrier 24 and the airbag 22 and between airbag surfaces. The location and number of the stabilizing tethers may be determined using available engineering analysis tools, e.g., CAE analysis.

Figure 14:
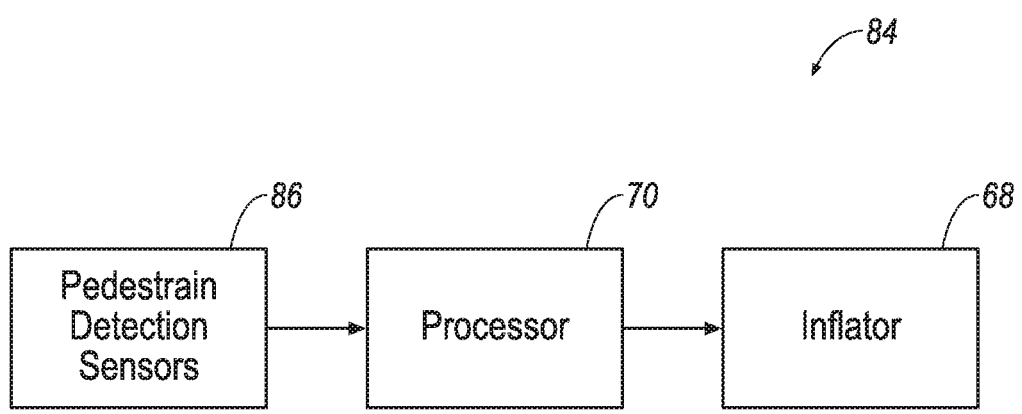
FIG. 14 is a processing schematic of the airbag system of FIGS. 1-13.

With reference to FIG. 14 the vehicle 28 may include an inflation system 84. The inflation system 84 includes the processor 70. The processor 70 is programmed to initiate an inflation of the airbag 22 in response to the pedestrian proximity. The processor 70 may be embedded in a microcontroller. The microcontroller may include memory, etc. The memory of the microcontroller may store instructions executable by the processor 70 and the processor 70 may read the instructions from the memory and execute the instructions.

The vehicle 28 may include pedestrian sensors 86 programmed to detect a pedestrian in a forward path of the vehicle 28 as part of a PAEB system. The pedestrian sensors 86 may be used to detect pedestrians in the forward path of the vehicle 28. The pedestrian sensors 86 may be disposed in the fascia 30 or any suitable forward-facing part of the vehicle 28. The pedestrian sensors 86 may be of various types, e.g., ultrasonic sensors, radar sensors, vision sensors (e.g., camera, LIDAR), etc. When the pedestrian is in the path of the vehicle 28, the processor 70 may receive one or more signals from the pedestrian sensors 86 indicating the pedestrian's presence. In response to receiving the signals from the pedestrian sensors 86, the processor 70 may initiate the inflation of the airbag 22.

In order to receive the signals from the pedestrian sensors 86 and to initiate the inflation of the airbag 22, the processor 70 communicates with the pedestrian sensors 86 and the inflator 68, e.g., through a direct electrical wiring, through which an analog or a digital signal is transmitted, or through a communication network like CAN (Control Area Network), Ethernet, LIN (Local Interconnect Network) or any other way.

In operation, the airbag 22 is in the uninflated position, as shown in FIGS. 1-10, under normal operating conditions of the vehicle 28. When the pedestrian sensors 86 sense a pedestrian in the path of the vehicle 28, the processor 70, which may serve as part of a PAEB system, may provide a warning to the driver that an intervention is required. If timely action is not taken by the driver and a potential impact is predicted, the processor 70 will actuate the vehicle's service brakes independent of the driver's input to potentially avoid the impact. The processor 70 may further trigger the inflator 68 to inflate the airbag 22 with the inflation medium from the uninflated position to the inflated position. When the inflator 68 inflates the airbag 22 to the inflated position, the inflation medium flows to the inflation chamber increasing the pressure in chambers 42, 44. As the pressure is increased in the chambers 42, 44, the airbag 22 breaks through the tear-seam 74 of the trim panel 26, and panels 76 deflect, extending outward at the broken seam 74. The chutes 78, 80 help guide the chambers 42, 44 through the tear-seam 74. During inflation, the upper chamber 42 expands in the upward direction D1 and the lower chamber 44 expands in the downward direction D2. The middle seam 46, when connected directly to the carrier 24, remains between the carrier 24 and the trim panel 26. When the middle seam 46 is connected to the carrier 24 by the intermediate retention tethers 66, the middle seam 46 may move through the tear-seam 74 and outside of the trim panel 26. As the airbag 22 expands, the stabilizing tethers 83 restrain an expansion of the chambers 42, 44 and their respective subchambers 48, 50, 56, 58. The airbag 22 in the inflated position provides coverage of the fascia 30 and a forward portion of the hood 34 so as to absorb impact energy of the knees and the head of the pedestrian, potentially reducing injuries.

The inflated airbag 22 resembles a ladder in shape in that the seams defining subchambers 48, 50, 56, 58 further define step-like surfaces of each of the subchambers 48, 50, 56, 58. The ladder-like configuration allows the airbag 22 to cover substantially all of a potential pedestrian impact area in the front end of the vehicle 28 as most clearly illustrated in FIG. 11. The ladder-like configuration further allows the airbag 22 to be fully inflated with 40% to 50% less volume of inflation medium than an airbag not having seams 46, 52, 60.

Use of the double-rolled design allows the lower chamber 44 to deploy downward to facilitate lower leg impact protection and allows the upper chamber 42 to deploy upward to facilitate upper leg and pelvis and head impact protection. The disclosed system 20 further allows elimination of a lower leg stiffener (deployable or swingable), a cross-car grille reinforcement, a pedestrian-friendly hood latch, and other front end structure modifications for pedestrian protection.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a grille;
a bumper disposed below the grille;
a hood disposed above the grille; and
an airbag inflatable to an inflated position from between the bumper and the grille;
the airbag having an upper chamber and a lower chamber each elongated in parallel in a cross-vehicle direction and separated from each other by a seam, the lower chamber being below the upper chamber;
the lower chamber including a first lower subchamber, a second lower subchamber below the first lower subchamber, and a lower secondary seam between the first lower subchamber and the second lower subchamber;
the first lower subchamber and the second lower subchamber each elongated in parallel in the cross-vehicle direction;
the first lower subchamber being elongated along the bumper in a vehicle-forward direction of the bumper;
the second lower subchamber including an upper end elongated along the bumper in a vehicle-forward direction of the bumper, the second lower subchamber extending vertically below the bumper in the inflated position;
the first lower subchamber and the second lower subchamber each having a forward-most face in vehicle-forward direction, the forward-most faces of the first lower subchamber and the second lower subchamber each being flat and vertical in the inflated position; and
the upper chamber extending upwardly from the lower chamber and rearwardly along the hood, the upper chamber having a forward-most face that extends upwardly and vehicle-rearward relative to the lower chamber.

2. The assembly as set forth in claim 1, wherein the airbag includes depressions at the seam and at the lower secondary seam, the depressions being elongated in the cross-vehicle direction.

3. The assembly as set forth in claim 1, further comprising a carrier and a trim panel fixed to the carrier enclosing the airbag between the carrier and the trim panel.

4. The assembly as set forth in claim 3, wherein the trim panel has a tear seam.

5. The assembly as set forth in claim 3, further comprising an inflator fixed to the carrier and in fluid communication with the upper chamber and the lower chamber.

6. The assembly as set forth in claim 3, wherein the trim panel is elongated in the cross-vehicle direction between the bumper and the grille.

7. The assembly as set forth in claim 3, further comprising a plurality of stabilizing tethers extending from the carrier to the airbag external to the airbag.

8. The assembly as set forth in claim 3, wherein the carrier includes an upper chute engaging the upper chamber of the airbag and a lower chute engaging the lower chamber of the airbag.

9. The assembly as set forth in claim 3, wherein the trim panel extends from the bumper to the grille.

10. The assembly as set forth in claim 1, further comprising a trim panel enclosing the airbag, the trim panel being elongated in the cross-vehicle direction between the bumper and the grille and having a tear seam.

11. The assembly as set forth in claim 10, wherein the trim panel extends from the bumper to the grille.

12. An assembly comprising:
a grille;
a bumper disposed below the grille;
a hood disposed above the grille;
an airbag inflatable to an inflated position from between the bumper and the grille; and
a carrier and a trim panel fixed to the carrier enclosing the airbag between the carrier and the trim panel;
the trim panel extending from the bumper to the grille and being elongated in the cross-vehicle direction
the trim panel having a tear seam;
the airbag having an upper chamber and a lower chamber each elongated in parallel in a cross-vehicle direction and separated from each other by a seam, the lower chamber being below the upper chamber;
the lower chamber including a first lower subchamber, a second lower subchamber below the first lower subchamber, and a lower secondary seam between the first lower subchamber and the second lower subchamber;
the first lower subchamber and the second lower subchamber each elongated in parallel in the cross-vehicle direction;
the first lower subchamber being elongated along the bumper in a vehicle-forward direction of the bumper;
the second lower subchamber including an upper end elongated along the bumper in a vehicle-forward direction of the bumper, the second lower subchamber extending vertically below the bumper in the inflated position;
the first lower subchamber and the second lower subchamber each having a forward-most face in vehicle-forward direction, the forward-most faces of the first lower subchamber and the second lower subchamber each being flat and vertical in the inflated position; and
the upper chamber extending upwardly from the lower chamber and rearwardly along the hood, the upper chamber having a forward-most face that extends upwardly and vehicle-rearward relative to the lower chamber.

* * * * *